United States Patent
Edo et al.

(10) Patent No.: US 9,033,206 B2
(45) Date of Patent: May 19, 2015

(54) BRAZING METHOD OF ALUMINUM MATERIAL AND BRAZED STRUCTURE

(71) Applicants: MITSUBISHI ALUMINUM CO., LTD., Tokyo (JP); TAIYO NIPPON SANSO CORPORATION, Tokyo (JP)

(72) Inventors: Masakazu Edo, Shizuoka (JP); Hideyuki Miyake, Shizuoka (JP); Masatoshi Akiyama, Shizuoka (JP); Yuji Nomura, Tokyo (JP); Norihiro Nose, Tokyo (JP); Hiroki Amano, Tokyo (JP)

(73) Assignee: MITSUBISHI ALUMINUM CO., LTD. (JP)

( * ) Notice: Subject to any disclaimer, the term of this patent is extended or adjusted under 35 U.S.C. 154(b) by 0 days.

(21) Appl. No.: 14/347,008

(22) PCT Filed: Nov. 22, 2013

(86) PCT No.: PCT/JP2013/081480
§ 371 (c)(1),
(2) Date: Mar. 25, 2014

(87) PCT Pub. No.: WO2014/097820
PCT Pub. Date: Jun. 26, 2014

(65) Prior Publication Data
US 2015/0017470 A1 Jan. 15, 2015

(51) Int. Cl.
*B23K 31/02* (2006.01)
*B23K 1/008* (2006.01)
*B23K 1/00* (2006.01)
(Continued)

(52) U.S. Cl.
CPC ............... *B23K 1/008* (2013.01); *B23K 1/0012* (2013.01); *B23K 1/19* (2013.01); *B23K 35/28* (2013.01); *B23K 35/22* (2013.01); *C22C 21/00* (2013.01); *B23K 2203/10* (2013.01);
(Continued)

(58) Field of Classification Search
None
See application file for complete search history.

(56) References Cited

U.S. PATENT DOCUMENTS 5,839,646 A 11/1998 Duda et al.
6,361,882 B1 * 3/2002 Shoji et al. .................... 428/654

(Continued)

FOREIGN PATENT DOCUMENTS

CN 103153516 6/2013
DE 19548244 6/1997

(Continued)

*Primary Examiner* — Kiley Stoner
(74) *Attorney, Agent, or Firm* — Baker Hostetler LLP

(57) ABSTRACT

In order to enable a satisfactory fluxless brazing without needing flux or vacuum facilities, a brazing object including an aluminum alloy material provided with an Al—Si—Mg brazing filler metal is joined by the Al—Si—Mg brazing filler metal without the use of flux by heating the aluminum alloy material, when raising the temperature in a brazing furnace, at least in a temperature range of 450° C. to before melting of the filler metal under a first inert gas atmosphere having an oxygen concentration of preferably 50 ppm and following by heating at least at or above a temperature at which the filler metal starts to melt under a second inert gas atmosphere having an oxygen concentration of preferably 25 ppm and a nitrogen gas concentration of preferably 10% by volume or less. The oxygen concentration and nitrogen concentration in the atmosphere in the course of brazing are controlled in this way, whereby the reliability of a joint is remarkably improved, compared with conventional fluxless brazing methods, while suppressing cost increases as much as possible.

10 Claims, 1 Drawing Sheet

(51) Int. Cl.
  *B23K 1/19*       (2006.01)
  *B23K 35/28*      (2006.01)
  *B23K 35/22*      (2006.01)
  *C22C 21/00*      (2006.01)
  *B32B 15/01*      (2006.01)
  *C22C 21/02*      (2006.01)

(52) U.S. Cl.
  CPC ...... *Y10T 428/12764* (2015.01); *B23K 35/286* (2013.01); *B32B 15/016* (2013.01); *C22C 21/02* (2013.01)

(56) References Cited

U.S. PATENT DOCUMENTS

| | | | |
|---|---|---|---|
| 8,455,110 B2* | 6/2013 | Wittebrood et al. | 428/654 |
| 2003/0051342 A1* | 3/2003 | Hasegawa et al. | 29/890.03 |
| 2004/0238605 A1* | 12/2004 | Nishimura et al. | 228/264 |
| 2011/0198392 A1* | 8/2011 | Wittebrood | 228/200 |
| 2011/0204124 A1* | 8/2011 | Wittebrood | 228/219 |
| 2013/0221077 A1 | 8/2013 | Kanda et al. | |

FOREIGN PATENT DOCUMENTS

| | | |
|---|---|---|
| EP | 0781623 | 7/1997 |
| EP | 2633938 | 9/2013 |
| JP | 09-085433 | 3/1997 |
| JP | 4037477 | 8/1997 |
| JP | 10-180489 | 7/1998 |
| JP | 3701847 | 1/2002 |
| JP | 2006-175500 | 7/2006 |
| WO | 2012057197 | 5/2012 |

\* cited by examiner

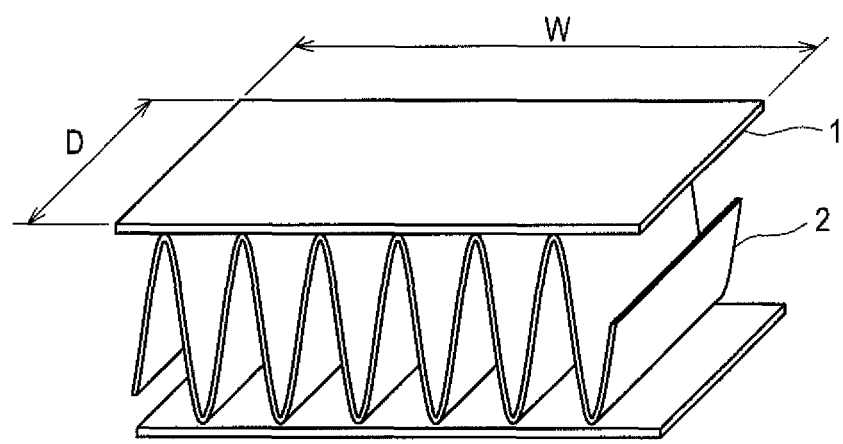

BRAZING METHOD OF ALUMINUM MATERIAL AND BRAZED STRUCTURE

TECHNICAL FIELD

The present invention relates to a brazing method of aluminum material for joining a brazing object including an aluminum alloy material by use of an Al—Si—Mg-based brazing filler metal without the use of flux, and a brazed structure joined by the brazing method.

BACKGROUND ART

At present, in automotive heat exchangers as represented by a radiator, a condenser, an intercooler and the like, and other heat exchangers, heat sinks and the like which are manufactured using aluminum alloys, a brazing method using a non-corrosive fluoride-based flux under inert gas atmosphere or a brazing method using a brazing filler metal including about 0.5 to 1.5% by mass of Mg under vacuum atmosphere are predominantly adopted.

In many cases of brazing using the above-mentioned flux, a brazing object member is put into a desired assembled state after being processed by press molding or the like, a turbid solution prepared by dissolving flux powder in a solvent is applied to the assembled body followed by drying, and brazing is then performed in a non-oxidizing atmosphere by high-purity nitrogen gas. This method has a problem in that even the use of flux, or the installation or management of an application step thereof is costly.

Furthermore, it is known that the flux is partially evaporated in the process of brazing heating, and adhered and accumulated on a inside wall of a furnace, and periodic maintenance of the furnace for removal of deposits is also produced as a necessary cost. In accordance with the current promotion of automotive lightening, further reduction in thickness and increase in strength of material are demanded even in the automotive heat exchangers. Although addition of Mg to aluminum alloy is very effective for increasing the strength of aluminum material, flux-using brazing have a problem in that all the added Mg cannot be contributed to the increase in strength, since $MgF_2$ having high melting point is produced through reaction of Mg with the flux, and this inhibits the brazing or consumes Mg in the material. Namely, in the flux brazing, the addition of Mg cannot be actively adopted as a means for increasing the strength of the material, under present circumstances, due to restrictions on the adding portion or amount of Mg in a product. In inverter coolers or the like for use in hybrid cars or electric cars, recently, the use of flux can be limited for reasons such that flux residue itself inhibits the solderability of a semiconductor component or the like.

On the other hand, in vacuum brazing, Mg added to brazing filler metal evaporates from the material in a temperature-raising process for brazing, and breaks an oxide film on aluminum material surface that is a brazing inhibiting factor in doing so, and, in the atmosphere, it brings the furnace internal atmosphere into a brazable state by its getter effect of coupling with moisture or oxygen therein. Although this method needs no flux application step, it has a problem in that considerable costs are produced for a vacuum furnace that is expensive equipment, airtightness management of the furnace, and the like. Moreover, although addition of Zn is performed for the purpose of securing the corrosion resistance of a product in the automotive heat exchangers and the like, the vacuum brazing is disadvantageous also in that Zn is not left in the material enough to secure sufficient corrosion resistance since Zn is evaporated under vacuum heating. Further, accumulation of the evaporated Mg or Zn on the furnace inner wall requires periodic cleaning of the furnace.

In response, recently, fluxless brazing under atmospheric pressure is proposed as a brazing method capable of solving the above-mentioned problems (refer to Patent Literatures 1 to 5).

For example, Patent Literature 1 proposes a fluxless brazing at atmospheric pressure in a non-oxidizing atmosphere by covering a brazing object while arranging an Mg-containing substance on the brazing object member or other portions.

Patent Literature 2 proposes a system such that a brazing object member is covered, inside a brazing furnace, by a windbreak (cover) which is preliminarily heated in the furnace to improve reduction in temperature rise rate.

On the other hand, as fluxless brazing that requires no cover, Patent Literature 3 proposes a method of adding Mg to brazing filler metal of a clad material, and fluxless-brazing the inside of a heat exchanger tube molded from the clad material at atmospheric pressure in an inert atmosphere.

Similarly, as a one that requires no cover, Patent Literature 4 proposes to enable an atmospheric brazing by adopting a laminated structure of a clad material, the clad material including an antioxidant layer clad on brazing filler metal surface.

Further, Patent Literature 5 proposes to enable a fluxless brazing under non-oxidizing atmosphere by cladding a brazing filler metal composed of an Al—Si—Mg alloy on a core material surface and pickling the material surface, prior to brazing, to reduce the thickness of an oxide film to 20 Å or less.

CITATION LIST

Patent Literature

Patent Literature 1: Japanese Patent Application Laid-Open No. 9-85433
Patent Literature 2: Japanese Patent Application Laid-Open No. 2006-175500
Patent Literature 3: Japanese Patent No. 4037477
Patent Literature 4: Japanese Patent No. 3701847
Patent Literature 5: Japanese Patent Application Laid-Open No. 10-180489
Patent Literature 6: International Publication No. 2012-057197

SUMMARY OF INVENTION

Technical Problem

In the technique proposed in Patent Literature 1, the covering is required, and application of this technique to mass production is troublesome and costly due to the necessity of preparation of covers by size or in an amount estimated to be used in mass production, and the necessity of the maintenance or the like of the covers. Moreover, the temperature rise rate of the brazing object is reduced by the covering, resulting in deteriorated productivity.

In the method shown in Patent Literature 2, a mechanism for controlling the operation of the windbreak within the furnace must be provided, and introduction and maintenance of equipment therefore are troublesome and costly.

Patent Literatures 3 to 5 for enabling brazing under atmospheric pressure with requiring no cover, also, have the following problems.

In the method proposed in Patent Literature 3, the joining of the outer surface of the tube and a fin is performed using flux, and the disadvantages resulting from the use of flux are not perfectly solved.

In the technique proposed in Patent Literature 4, against conventional materials used for vacuum brazing or NOCOLOCK brazing, the clad material having the antioxidant layer provided on brazing filler metal surface must be prepared, resulting in increased material cost. Further, this technique lacks general versatility since the product shape is limited to a laminated structure.

In the method shown in Patent Literature 5, the process control of the pickling is complicated, and the cost is increased for the pickling step.

Furthermore, in the conventional fluxless brazing methods, the joining strength is seriously reduced due to joint failures resulting from insufficient breakage and segmentation of the oxide film on brazing filler metal surface during brazing heat treatment. Moreover, if the oxygen concentration in the atmosphere is high in the manufacturing process or during the brazing heat treatment, an oxide film of Mg (MgO) is grown by reaction of Mg in the member with oxygen in the atmosphere to seriously reduce the joining rate. Therefore, a stable joining state cannot be obtained.

In view of such problems, the present invention has an object to provide a versatile fluxless brazing method of aluminum material, capable of securing a stable joining state at every portion regardless of the shape of a heat exchanger or the like, without producing introduction and operation costs for the flux application step, vacuum equipment or the like, sub-material costs for the covers to be used in brazing or the like, or new process costs for the material pickling or the like.

Solution to Problems

Aluminum is extremely easily oxidized by a reaction of the following expression (1), and brazability is deteriorated upon formation of an oxide film.

$$2Al + 3/2O_2 \rightarrow Al_2O_3 \qquad (1)$$

In fluxless brazing, it is necessary to improve the wettability or flowability of molten filler metal by segmenting the oxide film of a denser film shape at a joint into a granular shape as fine as possible. In terms of improvement in brazability, to reduce the oxygen concentration in the furnace atmosphere is also confirmed to be effective.

Even when Mg is added to the material such as the brazing filler metal or brazing object member for the segmentation of the oxide film, the brazability is seriously deteriorated, if the oxygen concentration in the atmosphere is high during brazing, since a stable MgO oxide layer is formed thickly on the surface, as shown in the following expression (2), due to promotion of the oxidation of Mg in the member. Although the oxide film on the surface is grown more during brazing as the storage time at high temperature is longer, the oxidation reaction rapidly proceeds at 550° C. or higher, and this reaction occurs even in solid phase.

$$Mg + 1/2O_2 \rightarrow MgO \qquad (2)$$

On the other hand, in a state with low oxygen concentration, satisfactory joining is performed since the oxide film $Al_2O_3$ on aluminum surface is changed to granular $MgAl_2O_4$ through reductive decomposition by Mg in the material, as shown in the following expression (3), and dispersed in a form of fine oxide.

$$3Mg + 4Al_2O_3 \rightarrow 3MgAl_2O_4 + 2Al \qquad (3)$$

Therefore, in order to obtain a satisfactory joining state, it is preferred to control the oxygen concentration in the atmosphere as low as possible.

In general, the cheapest nitrogen gas is used for the reduction in oxygen concentration. In Mg-containing molten filler metal, however, since the molten filler metal is in an active state with the oxide film on the surface being broken, it is considered that Mg reacts with nitrogen in the atmosphere, upon melting of the filler metal, to form a reaction layer mainly composed of nitride on the molten filler metal surface, as shown in the following expression (4), and as a result, the gap filling property is deteriorated, causing serious deterioration in the wettability of filler metal. Since this reaction is a reaction of molten filler metal (liquid phase) with atmospheric gas (gas phase) and never occurs in a solid phase state, it is important to reduce atmospheric $O_2$ and $N_2$ concentrations in a filler metal melting region within the furnace.

$$M(Al, Mg, Si) + N_2 \rightarrow M_xN_y \qquad (4)$$

The above-mentioned reactions (1) to (4) are considered to be apt to occur in the order of (2), (1), (3) and (4).

As a gas effective for the improvement in brazability other than $N_2$ gas, argon is proposed (refer to Patent Literature 6), but the use of argon leads to increased brazing costs since it is expensive, compared with $N_2$.

Since the above-mentioned reaction of $N_2$ gas is a reaction of molten filler metal (liquid phase) with atmospheric gas (gas phase) and never occurs in a solid phase state, it is important to reduce atmospheric $O_2$ and $N_2$ concentrations in the filler melting region within the furnace.

As a result of the earnest studies in view of the above-mentioned problems, the present inventors found that a joining state can be remarkably improved while suppressing cost increases by adding a proper amount of Mg to an Al—Si brazing filler metal and controlling oxygen concentration and nitrogen gas concentration in a furnace in a temperature-raising process for brazing according to a temperature range in an optimum manner, and have accomplished the present invention.

Namely, a brazing method of aluminum material according to a first aspect of the present invention comprises: joining a brazing object including an aluminum alloy material provided with an Al—Si—Mg brazing filler metal by the Al—Si—Mg brazing filler metal without the use of flux by heating the aluminum alloy material in a brazing furnace at least in a temperature range of 450° C. to before melting of the filler metal under a first inert gas atmosphere having an oxygen concentration of a first predetermined value and following by heating at least at or above a temperature at which the filler metal starts to melt under a second inert gas atmosphere having an oxygen concentration of a second predetermined value lower than the first predetermined value and a nitrogen gas concentration of a predetermined concentration.

A brazing method of aluminum material according to a second aspect of the present invention is characterized in that the Al—Si—Mg brazing filler metal and the aluminum alloy material constitute a brazing sheet by cladding the brazing filler metal on the aluminum alloy material as a core material in the first aspect of the invention.

A brazing method of aluminum material according to a third aspect of the present invention is characterized in that the first predetermined value is 50 ppm, the second predetermined value is 25 ppm, and the predetermined concentration of the nitrogen gas concentration is 10% by volume in the first or second aspect of the invention.

A brazing method of aluminum material according to a fourth aspect of the present invention is characterized in that the second inert gas atmosphere has an atmosphere of a rare gas or a mixed gas containing a rare gas as atmospheric gas in any one of the first to third aspects of the invention.

A brazing method of aluminum material according to a fifth aspect of the present invention is characterized in that the rare gas is argon gas in the fourth aspect of the invention.

A brazing method of aluminum material according to a sixth aspect of the invention is characterized in that the first inert gas atmosphere is obtained by substituting the atmosphere by nitrogen gas, and the second inert gas atmosphere is obtained by substituting the first inert gas atmosphere by the rare gas or the mixed gas containing rare gas in any one of the first to fifth aspects of the invention.

A brazing method of aluminum material according to a seventh aspect of the present invention is characterized in that the brazing filler metal contains Si: 5.0 to 13.0% and Mg: 0.1 to 3.0% by mass, with the balance of Al and unavoidable impurities in any one of the first to sixth aspects of the invention.

A brazing method of aluminum material according to an eighth aspect of the present invention is characterized in that the brazing filler metal further contains one or two or more of Be: 0.0001 to 0.1%, Bi: 0.01 to 0.3% and Ca: 0.002 to 0.3% by mass in the seventh aspect of the invention.

A brazing method of aluminum material according to a ninth aspect of the present invention is characterized in that the aluminum alloy material has a composition containing, one or two or more of Mn: 0.2 to 2.5%, Cu: 0.05 to 1.0% and Si: 0.1 to 1.0% by mass, with the balance of Al and unavoidable impurities in any one of the first to eighth aspects of the invention.

A brazing method of aluminum material according to a tenth aspect of the present invention is characterized in that the aluminum alloy material has a composition containing Mg: 0.01 to 1.0%, and further containing one or two or more of Mn: 0.2 to 2.5%, Cu: 0.05 to 1.0% and Si: 0.1 to 1.0% by mass, with the balance of Al and unavoidable impurities in any one of the first to ninth aspects of the invention.

A brazed structure according to an eleventh aspect of the present invention includes a brazing object joined by the brazing method of aluminum material according to any one of the first to tenth aspects of the invention.

Although the reduction in oxygen concentration in the atmosphere is required during brazing heating since the oxidation of an aluminum member proceeds according to a rise of temperature, it is advantageous from the viewpoint of costs, if in a stage before melting of the filler metal, to use the cheapest nitrogen gas for suppressing the oxidation since aluminum has no reactivity with nitrogen gas. However, after melting of the filler metal, if the nitrogen gas concentration in the atmosphere is high, the wettability of the filler metal is deteriorated too seriously to secure a sufficient joining since a nitride layer is formed on the molten filler metal surface. Namely, the reaction with nitrogen is a reaction of molten filler metal as liquid phase with nitrogen gas as gas phase, and according to the present invention, the stability of joining can be improved while reducing the used amount of expensive argon gas or the like by controlling the oxygen concentration and atmosphere before melting of filler metal and the oxygen concentration and nitrogen concentration in the atmosphere after melting of the filler metal, and the brazability can be secured in a compatible manner with the costs. If the used amount of argon gas or the like can be reduced, it is also effective to change the first inert gas atmosphere to an inter gas atmosphere including argon gas or the like. The inert gases in the first inert gas atmosphere and the second inert gas atmosphere may be the same or different.

The conditions specified in the present invention will be then described.

(Atmospheric Control in Brazing Process)
Temperature Range of 450° C. to Before Melting of Filler Metal
Oxygen Concentration and Inert Gas Atmosphere (First Inert Gas Atmosphere)

In order to suppress the deterioration of brazability resulting from the growth of oxide film on material surface during brazing heating at 450° C. or higher, it is needed to regulate the oxygen concentration. Although joining can be performed even at high oxygen concentration, the joining rate or joining strength can be reduced depending on the shape of a joint.

The kind of the inert gas is not particularly specified although it is advantageous from the viewpoint of costs to adopt an inexpensive nitrogen gas atmosphere for reducing the oxygen concentration, since nitrogen gas has no reactivity with aluminum material before melting of filler metal. Any optional inert gas can be used without needing a particular regulation on nitrogen gas concentration.

The temperature upper limit in the first inert gas atmosphere is not particularly limited, if before melting of filler metal, but is set preferably up to a temperature as close to melting of filler metal as possible, more preferably to a temperature just before melting of filler metal.

With respect to the oxygen concentration in the first inert gas atmosphere, a predetermined value lower than a predetermined value of oxygen concentration in the second inert gas is taken as an upper limit. The regulation on oxygen concentration in the first inert gas atmosphere can be laxer than that for inhibition of oxidation during melting since it is intended for inhibition of oxidative growth in solid phase. Concretely, for example, the oxygen concentration is set to 50 ppm or less. At an oxygen concentration exceeding 50 ppm, the joining state becomes unstable since the growth of the oxide film of Al or Mg is promoted during brazing heating to deteriorate the wettability upon melting of the filler metal, and the gap filling property or joining strength is particularly deteriorated. In an area with higher temperature, the growth of the oxide film is suppressed more as the oxygen concentration is lower. Therefore, in a temperature range of 500° C. to before melting of the filler metal, the oxygen concentration may be regulated to 25 ppm or less. The oxygen concentration in the first inert gas atmosphere is more preferably 20 ppm or less.

Although further reduction in oxygen concentration in the atmosphere allows further improvement in joining rate, this requires improvement in airtightness of the furnace or significant increase in usage of inert gas, causing cost increases.

At Least at or Above Temperature at Which Filler Metal Starts to Melt
Oxygen Concentration and Nitrogen Gas Concentration (Second Inert Gas Atmosphere)

At or above a temperature at which the filler metal starts to melt, oxygen concentration and nitrogen gas concentration are regulated as the second inert gas atmosphere. The second inert gas atmosphere may be started from below the temperature at which the filler metal starts to melt.

When molten filler metal is produced, the reaction with the gases in the atmosphere is remarkably promoted. Namely, the wettability is seriously deteriorated due to the formation of a reaction layer unless the oxygen concentration and nitrogen concentration are reduced in and above a temperature range in which the filler metal starts to melt. In the case of Mg-containing brazing filler metal, it is necessary to suppress the growth of the reaction layer by controlling not only the oxygen concentration but also the nitrogen concentration, since the brazing filler metal surface is activated.

With respect to the oxygen concentration in the second inert gas atmosphere, a regulation value lower than the regulation value of oxygen concentration in the first inert gas atmosphere is determined since it is intended for inhibition of oxidation during melting. Concretely, the oxygen concentration is set to, for example, 25 ppm or less. At an oxygen concentration exceeding 25 ppm, it becomes difficult to sufficiently promote the reaction of the expression (3) since the oxide film of magnesium (MgO) is markedly grown. The oxygen concentration is more preferably 20 ppm or less. However, further reduction in oxygen concentration causes cost increases since it requires improvement in airtightness of the furnace or increased usage of inert gas.

In the second inert gas atmosphere, the reaction of the expression (4) is prevented from proceeding by regulating the nitrogen concentration, whereby the brazability inhibiting factor by atmospheric gas is eliminated. Concretely, for example, the nitrogen concentration in the atmosphere is set to 10% by volume or less. When the nitrogen concentration exceeds 10% by volume, the reaction of the expression (4) is apt to proceed, and the growth of the nitride layer is significantly promoted to deteriorate the brazability. Preferably, the nitrogen concentration is set to 5% by volume or less. Although the joining rate is improved by further reducing the nitrogen gas concentration in the atmosphere, this is undesirable from the view of costs since the usage of inert gas such as more expensive argon or helium is increased.

As the gas for forming the second inert gas atmosphere, one of rare gases such as argon, helium and xenon which have no reactivity with aluminum, or a mixed gas thereof is used. From the viewpoint of costs, argon is most preferred. Further, different rare gases can be used at different times.

Namely, the gas such as argon or helium is efficiently applied to only a region where filler metal is molten, whereby the usage of such gas is reduced to attain the improvement in brazability in a compatible manner with costs.

Since the above-mentioned atmosphere can be obtained by various methods, such as installation of a partition plate inside the furnace or optimization of gas blowing method, the structure of the brazing furnace or the like is not particularly specified herein. Further, it is also effective for the reduction in cost to recover and recirculate the used argon gas.

Although the regulated value of oxygen concentration is differed between in the first inert gas atmosphere and in the second inert gas atmosphere, the magnitude relation of the concentration itself is not particularly limited. However, since the first inert gas atmosphere is generally obtained by substituting the air atmosphere by inert gas such as nitrogen gas, and the second inert gas atmosphere is obtained from the first inert gas atmosphere through atmospheric adjustment, it is efficient that the oxygen concentration in the first inert gas atmosphere is higher than the oxygen concentration in the second inert gas atmosphere.

Although the first inert gas atmosphere and the second inert gas atmosphere can be under atmospheric pressure, they may be brought into a pressurized state for maintaining the atmosphere, for example, into a pressurized state of 1.2 atmospheric pressures or less.

In the present invention, although the components of the brazing filler metal and aluminum alloy material are not limited to special ones, preferable compositions thereof are illustrated below. Each of the components is shown by mass %.

The brazing filler metal and aluminum alloy material can be provided as a brazing sheet in which the brazing filler metal is clad on the aluminum alloy material as a core material. In addition to this, the brazing filler metal or aluminum alloy material can be used alone as a brazing structural member in combination with the above-mentioned brazing sheet or the like.

(Brazing Filler Metal Alloy Component)

Mg: 0.1 to 3.0%

Mg in brazing filler metal improves the wettability or flowability of the filler metal to improve the joining rate by reductively decomposing the dense oxide film ($Al_2O_3$) formed on material surface into a fine granular oxide shape. As a result, the metal/metal joining area in a joint interface is increased to improve the joining strength. For obtaining these effects, Mg is preferably included in an amount of 0.1% or more, and when its content is below 0.1%, a sufficient joining state is hardly obtained due to insufficient reduction and degradation actions on the $Al_2O_3$ oxide film. On the other hand, when the content exceeds 3.0%, rolling becomes difficult due to increased strength of the brazing filler metal. Further, the oxide film of Mg is apt to grow thickly to inhibit the brazability. Therefore, the content of Mg is preferred to be in the above-mentioned range. For the same reasons, it is more preferred to set the lower limit thereof to 0.25% or upper limit thereof to 2.0% respectively.

Si: 5.0 to 13.0%

Si is an element to be essentially included in Al brazing filler metal because it reduces the melting point of the brazing filler metal, when included therein, so that the brazing filler metal is molten at a brazing temperature to form a predetermined joint. Further, the growth of the dense oxide film of aluminum is suppressed on Si particles existing on the brazing filler metal surface, and a defective portion is produced in the oxide film. Namely, even if the oxide film on aluminum material surface is thickened during brazing heat treatment, exudation of molten filler metal is caused from the periphery of the Si particles to promote the breakage or segmentation of the oxide film from this site, whereby the wettability of the molten filler metal can be improved to secure a further stable joining state. For obtaining these effects, Si is preferably included in an amount of 5.0% or more. When its content is below 5.0%, a sufficient joint cannot be obtained since the liquid phase is not produced enough. On the other hand, when the content exceeds 13.0%, primary crystal Si is rapidly increased to deteriorate the workability as material, and the erosion of the joint is also seriously promoted during brazing. Therefore, the content of Si is preferred to be in the above-mentioned range. For the same reasons, it is more preferred to set the lower limit thereof to 6.5% or upper limit thereof to 11.0%.

Be: 0.0001 to 0.1%

Be is included as needed, since it suppresses the formation and growth of the reaction layer mainly composed of Mg (oxide or nitride) on molten filler metal surface to facilitate the securement of satisfactory joining even when the oxygen concentration or nitrogen concentration in the atmosphere during melting of the filler metal is high. To obtain the above-mentioned effect, Be is preferably included in an amount of 0.001% or more. When its content is below 0.0001%, the effect is insufficient. On the other hand, even when the content exceeds 0.1%, the effect is saturated. Therefore, the content of Be is preferred to be in the above-mentioned range. For the same reasons, it is more preferred to set the lower limit thereof to 0.0002% or upper limit thereof to 0.01%.

Bi: 0.01 to 0.3%

Bi reduces the melting point by coexistence with Mg to cause the exudation of filler metal at from low temperature to promote the breakage or segmentation of the oxide film from this site, whereby the wettability of the molten filler metal can be improved to secure a further stable joining state. Therefore, Bi is included as needed. To obtain the above-mentioned effect, Be is preferably included in an amount of 0.01% or more. When its content is below 0.01%, the effect is insufficient. On the other hand, when the content exceeds 0.3%, deterioration in rollability of the brazing filler metal is caused. Therefore, the content of Bi is preferred to be in the above-mentioned range. For the same reasons, it is further preferred to set the lower limit thereof to 0.05% or upper limit thereof to 0.2%.

Ca: 0.002 to 0.3%

Ca is included as needed, since it improves the wettability of molten filler metal by reductively decomposing the oxide film of Al and Mg formed on the brazing filler metal surface. To obtain this effect, Ca is preferably included in an amount of 0.002% or more. When its content is below 0.002%, the effect is insufficient. On the other hand, when the content exceeds 0.3%, the oxidation of the brazing filler metal surface is promoted, resulting in reduced joining rate. Therefore, the content of Ca is preferred to be in the above-mentioned range. For the same reasons, it is more preferred to set the lower limit thereof to 0.005% or upper limit thereof to 0.2%.

(Aluminum Alloy Material Component)

Mn: 0.2 to 2.5%

Mn is included as needed since it improves the strength after brazing by crystallizing or precipitating as an intermetallic compound, and also improves the corrosion resistance by making the potential of the core material noble. To obtain these effects, Mn is preferably included in an amount of 0.2% or more. When its content is below 0.2%, the above-mentioned effects are insufficient. On the other hand, when the content exceeds 2.5%, a giant intermetallic compound is produced during casting cause to inhibit castability or rollability. Therefore, the content of Mn is preferred to be 0.2 to 2.5%. For the same reasons, it is more preferred to set the lower limit thereof to 1.0% or upper limit thereof to 1.7%.

Cu: 0.05 to 1.0%

Cu is included as needed, since it improves the strength after brazing by dissolving in the material, and also improves the corrosion resistance by making the potential of the core material noble. To obtain these effects, Cu is preferably included in an amount of 0.05% or more. When its content is below 0.05%, the above-mentioned effects are insufficient. On the other hand, when the content exceeds 1.0%, cracking during casting or deterioration in rollability is caused. Therefore, the content of Cu is preferred to be 0.05 to 1.0%. For the same reasons, it is more preferred to set the lower limit thereof to 0.1% or upper limit thereof to 0.8%.

Si: 0.1 to 1.0%

Si has an effect of improving the material strength by dissolving alone in a matrix and also by dispersing as an Al—Mn—Si compound, when included simultaneously with Mn. Further, if Mg is present, $Mg_2Si$ is precipitated after brazing heat treatment to remarkably improve the material strength by age hardening. Therefore, Si is included as needed. To obtain these effects, Si is preferably included in an amount of 0.1% or more. When its content is below 0.1%, the above-mentioned effects are insufficient. On the other hand, when the content exceeds 1.0%, the core material is molten during brazing since the melting point is lowered. Therefore, the content of Si is preferred to be 0.1 to 1.0%. For the same reasons, it is more preferred to set the lower limit thereof to 0.4% or upper limit thereof to 0.8%.

Mg: 0.01 to 1.0%

Mg has an effect of remarkably improving the material strength through enhancement of solid solution when used alone, and through age hardening, when included simultaneously with Si, by precipitating as a fine intermetallic compound $Mg_2Si$ after brazing. It exhibits the same strength effect also with Si diffused from the brazing filler metal during brazing heating. Further, it effectively promotes the breakage of the oxide film on the brazing filler metal surface by partially diffusing to the brazing filler metal. Therefore, Mg is included as needed. To obtain these effects, Mg is preferably included in an amount of 0.01% or more Mg. When its content is below 0.01%, the above-mentioned effects are insufficient. On the other hand, when the content exceeds 1.0%, the core material is molten during brazing since the melting point is lowered. Therefore, the content of Mg is preferred to be 0.01 to 1.0%. For the same reasons, it is more preferred to set the lower limit thereof to 0.2% or upper limit thereof to 0.6%.

Advantageous Effects of Invention

As described so far, according to the present invention, the reliability of a joint can be remarkably improved while suppressing cost increases as much as possible, compared with conventional fluxless brazing methods, by controlling the oxygen concentration and nitrogen concentration in the atmosphere in the course of brazing.

BRIEF DESCRIPTION OF DRAWINGS

FIG. 1 is a schematic view of a sample in examples of the present invention.

EMBODIMENTS FOR CARRYING OUT THE PRESENT INVENTION

Although a method for manufacturing an aluminum member used for the present brazing is not particularly limited, the oxide film thickness on the material before brazing is preferred to be as thin as possible. Since the oxide film is grown only slightly during thermal loading in the manufacturing process, the heat treatment step is preferably performed at a temperature as low as possible and in a time as short as possible. It is also effective to reduce the oxygen concentration in the atmosphere during heat treatment such as annealing.

One Embodiment of the Present Invention Will be then Described

An Al—Si—Mg brazing filler metal containing preferably Si: 5.0 to 13.0% and Mg: 0.1 to 3.0%, with the balance Al and unavoidable impurities, and a core material that is an aluminum alloy member, which can be manufactured by usual methods, are clad-rolled by hot rolling with laying both or added material such as a sacrificial material. The manufacturing conditions in the clad rolling are not particularly limited in the present invention. Further, the clad rate of each layer is not specified in the present invention.

As the core material, a one having a composition containing, by mass, one or two or more of Mn: 0.2 to 2.5%, Cu: 0.05 to 1.0% and Si: 0.1 to 1.0%, further Mg: 0.01 to 1.0% as needed, with the balance Al and unavoidable impurities, can be given as an example.

The hot-rolled clad material is further cold rolled into a predetermined final plate thickness and, thereafter, heat treatment for texture control or tempering can be performed thereon as needed.

(Content of Heat Treatment)

Intermediate annealing or final annealing for adjusting physical properties of the material is generally carried out in a batch furnace or continuous annealing furnace, and the heat treatment temperature thereof is generally set in a range of 100 to 420° C. Although a method for manufacturing the aluminum member used in the present brazing is not particularly limited, the heat treatment step is preferably performed at a temperature as low a possible and in a time as short as possible since the oxide film is grown only slightly also during the annealing. However, in view of soaking of the material, it is preferred to impart a constant retention time, and in the case of batch annealing, the material is retained at a predetermined temperature for 1 to 3 hours. Although the oxide film is never seriously grown even when the annealing or the like is performed in the atmosphere, it is effective also to suppress the growth of the oxide film by reducing the oxygen concentration within the furnace by use of DX gas (exothermic converted gas), nitrogen gas, hydrogen gas or the like.

In an aluminum clad material obtained by the usual method, the above-mentioned Al—Si—Mg brazing filler metal is located at the outermost surface, and an oxide film with an initial oxide film thickness of 20 to 500 Å is formed thereon.

The above-mentioned aluminum clad material is assembled to a brazing object member such as a bare fin or solid connector to preferably constitute a heat exchanger assembly or the like. As the brazing object member, aluminum materials of various compositions can be used without being limited to particular ones in the present invention.

The above-mentioned assembly is disposed in a heating furnace having an inert gas atmosphere. The inert gas atmosphere corresponds to the first inert gas atmosphere of the present invention. Although the inert gas atmosphere is generally set to the atmospheric pressure, a decompression step may be included for the purpose of gas substitution of the inside of the heat exchanger. The heating furnace does not need to have a sealed space, and can have a carry-in gate and a carry-out gate for brazing material. Even such a heating furnace can be brought into an oxidation-inhibiting atmosphere by continuously blowing the inert gas into the furnace. In nitrogen gas atmosphere, the oxygen concentration is preferably regulated to 50 ppm or less by volume.

In a region reaching a temperature at which the brazing filler metal melts within the heating furnace, the oxygen concentration is adjusted to 25 ppm and nitrogen concentration is adjusted to 10% by volume by substituting the atmosphere by the rare gas having no reactivity with molten filler metal, such as argon. The atmosphere after the substitution by the rare gas corresponds to the second inert gas atmosphere of the present invention.

In the above-mentioned atmosphere, brazing is performed by heating at 559 to 620° C. In the brazing, a close contact portion with the brazing object member is satisfactorily joined in a fluxless manner.

In the above-mentioned description, the brazing filler metal and aluminum alloy material are provided as a brazing sheet in which the brazing filler metal is clad on an aluminum alloy member. In addition to this, simple brazing filler metal or simple aluminum alloy material can be combined therewith to constitute a brazed structure.

EXAMPLE 1

An aluminum brazing sheet was prepared by cladding a brazing filler metal having a composition shown in Table 1 (with the balance of Al and unavoidable impurities) to a surface of a core material having a composition similarly shown in Table I (corresponding to the aluminum alloy member of the present invention, with the balance of Al and unavoidable impurities). The sheet was finished into an H14-tempered O-material having thickness of 0.25 mm with a brazing filler metal of clad rate of 10%. The brazing sheet 1 was combined with a corrugated fin 2 of JIS A3003 bare material to constitute a sample of width (W) 50 mm and depth (D) 25 mm, which is shown in FIG. 1, and brazing test was performed on the sample. The corrugated fin corresponds to the brazing object of the present invention.

An inert gas such as nitrogen or argon was used for the reduction in oxygen concentration in the atmosphere before melting of the filler metal, and argon, helium or a mixed gas thereof was used for atmospheric control in the filler metal melting region. The oxygen concentration and nitrogen concentration in the atmosphere in each temperature range during brazing were measured to examine relations with brazability. The oxygen concentration was measured using a zirconia oxygen meter, and the nitrogen gas concentration was measured by gas chromatography.

The brazability was evaluated by determining a joining rate of the fin according to the following equation.

Fin joining rate=(Total brazing joint length of fin and tube/Total contact length of fin and tube)×100

TABLE 1

| Sample No. | Brazing filler metal alloy component (wt %) | | | | | Core material alloy component (wt %) | | | | Melting start temperature of brazing filler metal (°C.) | 450° C. to melting start temperature of brazing filler metal | | At or above filler metal melting temperature | | Brazability Fin joining rate (%) |
|---|---|---|---|---|---|---|---|---|---|---|---|---|---|---|---|
| | Si | Mg | Be | Bi | Ca | Mo | Cu | Si | Mg | | Atmospheric gas used | Oxygen concentration (ppm) | Atmospheric gas used | Oxygen concentration (ppm) | Nitrogen concentration (vol %) |
| Example 1 | 5.0 | 0.5 | — | — | — | 0.2 | 0.05 | 0.1 | — | 565 | N₂ 100% | 100 | Ar 100% | 50 | 10 | 85 |
| 2 | 6.5 | 1.0 | — | — | — | 0.5 | 0.1 | 0.3 | — | 559 | " | 75 | " | 25 | 10 | 90 |
| 3 | 8.0 | 1.0 | — | — | — | 1.0 | 0.2 | 0.5 | — | 559 | " | 50 | " | 20 | 7.5 | 95 |
| 4 | 9.0 | 1.5 | — | — | — | 1.3 | 0.3 | 0.5 | — | 559 | " | 30 | " | 20 | 7.5 | 98 |
| 5 | 10.0 | 1.5 | — | — | — | 1.5 | 0.5 | 0.5 | — | 559 | " | 25 | " | 10 | 5.0 | 100 |
| 6 | 11.0 | 2.0 | — | — | — | 1.7 | 0.5 | 0.6 | — | 559 | " | 20 | " | 10 | 5.0 | 100 |
| 7 | 12.0 | 2.0 | — | — | — | 2.0 | 0.8 | 0.8 | — | 559 | " | 15 | " | 10 | 2.5 | 100 |
| 8 | 13.0 | 8.0 | — | — | — | 2.5 | 1.0 | 1.0 | 0.01 | 559 | " | 10 | " | 5 | 2.5 | 100 |
| 9 | 10.0 | 0.1 | — | — | — | 1.0 | 0.2 | 0.8 | 0.1 | 575 | N₂ 50% + Ar 50% | 80 | " | 20 | 1.0 | 95 |
| 10 | 10.0 | 0.25 | — | — | — | 1.0 | 0.2 | 0.8 | 0.2 | 568 | " | 25 | " | 15 | 1.0 | 98 |
| 11 | 10.0 | 0.3 | — | — | — | 1.0 | 0.3 | 0.8 | 0.3 | 565 | " | 20 | " | 10 | 0.5 | 99 |
| 12 | 10.0 | 0.5 | — | — | — | 1.0 | 0.3 | 0.8 | 0.4 | 563 | " | 15 | " | 5 | 0.5 | 100 |
| 13 | 10.0 | 1.0 | — | — | — | 1.5 | 0.5 | 0.6 | 0.5 | 559 | Ar 100% | 40 | " | 20 | 0.2 | 100 |
| 14 | 10.0 | 1.5 | — | — | — | 1.5 | 0.5 | 0.6 | 0.6 | 559 | " | 25 | " | 20 | 0.2 | 100 |
| 15 | 10.0 | 2.0 | — | — | — | 1.5 | 0.5 | 0.6 | 0.7 | 559 | " | 20 | " | 15 | 5.0 | 100 |
| 16 | 10.0 | 2.5 | — | — | — | 1.5 | 0.5 | 0.4 | 0.8 | 559 | " | 15 | " | 10 | 3.0 | 100 |
| 17 | 10.0 | 8.0 | — | — | — | 1.5 | 0.8 | 0.5 | 1.0 | 559 | " | 10 | " | 5 | 2.0 | 100 |
| 18 | 10.0 | 1.5 | 0.0001 | — | — | 1.0 | 0.2 | 0.5 | — | 559 | N₂ 100% | 75 | " | 50 | 2.0 | 95 |
| 19 | 10.0 | 1.5 | 0.0003 | — | — | 1.0 | 0.2 | 0.5 | — | 559 | " | 50 | " | 20 | 1.5 | 99 |
| 20 | 10.0 | 1.5 | 0.005 | — | — | 1.0 | 0.2 | 0.5 | — | 559 | " | 80 | " | 20 | 1.0 | 100 |
| 21 | 10.0 | 1.5 | 0.01 | — | — | 1.0 | 0.2 | 0.5 | — | 559 | " | 20 | " | 15 | 1.0 | 100 |
| 22 | 10.0 | 1.5 | 0.1 | — | — | 1.0 | 0.2 | 0.5 | — | 559 | " | 10 | " | 7 | 0.5 | 100 |
| 23 | 10.0 | 1.5 | — | 0.01 | — | 1.5 | 0.2 | 0.7 | — | 558 | " | 75 | Ar 50% + He 50% | 20 | 2.5 | 100 |
| 24 | 10.0 | 1.5 | — | 0.05 | — | 1.5 | 0.7 | 0.7 | — | 556 | " | 50 | " | 20 | 2.5 | 100 |
| 25 | 10.0 | 1.5 | — | 0.1 | — | 1.5 | 0.7 | 0.7 | — | 555 | " | 30 | " | 10 | 2.5 | 100 |
| 26 | 10.0 | 1.5 | — | 0.2 | — | 1.5 | 0.7 | 0.7 | — | 555 | " | 20 | " | 20 | 2.5 | 100 |
| 27 | 10.0 | 1.5 | — | 0.3 | — | 1.5 | 0.7 | 0.7 | — | 553 | " | 10 | " | 10 | 2.5 | 100 |
| 28 | 10.0 | 1.5 | — | — | 0.002 | 1.5 | 0.7 | 0.7 | 0.3 | 559 | " | 25 | " | 20 | 1.0 | 100 |
| 29 | 10.0 | 1.5 | — | — | 0.005 | 1.5 | 0.7 | 0.7 | 0.8 | 559 | " | 25 | " | 20 | 1.0 | 100 |
| 30 | 10.0 | 1.5 | — | — | 0.01 | 1.5 | 0.7 | 0.7 | 0.8 | 559 | " | 25 | " | 20 | 1.0 | 100 |
| 31 | 10.0 | 1.5 | — | — | 0.1 | 1.5 | 0.7 | 0.7 | 0.3 | 559 | " | 25 | He 100% | 15 | 1.0 | 100 |
| 32 | 10.0 | 1.5 | — | — | 0.2 | 1.5 | 0.7 | 0.7 | 0.8 | 559 | " | 25 | " | 15 | 1.0 | 100 |
| 33 | 10.0 | 1.5 | — | — | 0.3 | 1.5 | 0.7 | 0.7 | 0.8 | 559 | " | 25 | " | 15 | 0.5 | 100 |
| 34 | 10.0 | 1.5 | 0.005 | 0.12 | — | 1.5 | 0.7 | 0.7 | 0.5 | 555 | " | 25 | " | 15 | 0.5 | 100 |
| 35 | 10.0 | 1.5 | — | 0.12 | 0.1 | 1.5 | 0.7 | 0.7 | 0.5 | 555 | " | 25 | " | 10 | 0.5 | 100 |
| 36 | 10.0 | 1.5 | 0.005 | — | 0.1 | 1.5 | 0.7 | 0.7 | 0.5 | 559 | " | 25 | " | 10 | 0.5 | 100 |
| 37 | 10.0 | 1.5 | 0.005 | 0.12 | 0.1 | 1.5 | 0.7 | 0.7 | 0.5 | 555 | " | 25 | " | 10 | 0.5 | 100 |
| 38 | 10.0 | 1.5 | — | — | — | 1.5 | 0.5 | 0.75 | — | 559 | " | 100 | Ar 100% | 20 | 5.0 | 97 |
| 39 | 10.0 | 1.5 | — | — | — | 1.5 | 0.5 | 0.75 | — | 559 | " | 100 | He 100% | 20 | 5.0 | 95 |
| 40 | 10.0 | 1.5 | — | — | — | 1.5 | 0.5 | 0.75 | — | 555 | Ar 100% | 25 | Ar 100% | 20 | 0.5 | 100 |
| 41 | 10.0 | 1.5 | — | — | — | 1.5 | 0.5 | 0.75 | — | 559 | " | 25 | He 100% | 20 | 0.5 | 100 |
| 42 | 10.0 | 1.5 | — | — | — | 1.5 | 0.5 | 0.75 | — | 555 | N₂ 50% + Ar 50% | 25 | Ar 50% + He 50% | 20 | 2.5 | 100 |

TABLE 1-continued

| Sample No. | | Brazing filler metal alloy component (wt %) | | | | | Core metarial alloy component (wt %) | | | | | Melting start temperature of brazing filler metal (° C.) | 450° C. to melting start temperature of brazing filler metal | | At or above filler metal melting temperature | | | Brazability Fin joining rate (%) |
|---|---|---|---|---|---|---|---|---|---|---|---|---|---|---|---|---|---|---|
| | | Si | Mg | Be | Bi | Ca | Mo | Cu | Si | Mg | | | Atmospheric gas used | Oxygen concentration (ppm) | Atmospheric gas used | Oxygen concentration (ppm) | Nitrogen concentration (vol %) | |
| | 43 | 10.0 | 1.5 | — | — | — | 1.5 | 0.5 | 0.75 | 0.5 | 559 | " | 25 | Xe 100% | 20 | 2.5 | 100 |
| | 44 | 10.0 | 1.5 | — | — | — | 1.5 | 0.5 | 0.75 | 0.5 | 559 | N₂50% + He50% | 25 | Ar 100% | 50 | 3.0 | 95 |
| | 45 | 10.0 | 1.5 | — | — | — | 1.5 | 0.5 | 0.75 | 0.5 | 559 | " | 25 | Ar50% + He50% | 50 | 3.0 | 95 |
| | 46 | 10.0 | 1.5 | — | — | — | 1.5 | 0.5 | 0.75 | 0.5 | 559 | He 100% | 25 | Ar 100% | 10 | 1.0 | 100 |
| | 47 | 10.0 | 1.5 | — | — | — | 1.5 | 0.5 | 0.75 | 0.5 | 559 | " | 25 | He 100% | 10 | 0.5 | 100 |
| Comparative Example | 1 | 10.0 | 1.5 | — | — | — | 1.5 | 0.5 | 0.75 | 0.5 | 559 | Ar 100% | 80 | N₂100% | 75 | 99.9 | 10 |
| | 2 | 10.0 | 1.5 | — | — | — | 1.5 | 0.5 | 0.75 | 0.5 | 559 | " | 10 | " | 15 | 99.9 | 50 |
| | 3 | 10.0 | 1.5 | — | — | — | 1.5 | 0.5 | 0.75 | 0.5 | 559 | N₂100% | 30 | " | 80 | 99.9 | 40 |
| | 4 | 10.0 | 1.5 | — | — | — | 1.5 | 0.5 | 0.75 | 0.5 | 559 | " | 50 | Ar 100% | 50 | 50.0 | 65 |
| | 5 | 10.0 | 1.5 | — | — | — | 1.5 | 0.5 | 0.75 | 0.5 | 559 | " | 75 | " | 100 | 25.0 | 60 |
| Reference Example | 1 | 3.0 | 1.5 | — | — | — | 1.5 | 0.5 | 0.75 | — | 559 | N₂100% | 50 | Ar 100% | 20 | 2.5 | 25 |
| | 2 | 13.5 | 1.5 | — | — | — | 1.5 | 0.5 | 0.75 | — | 559 | Non-producible due to cracking of brazing filler metal during rolling | | | | | | 10 |
| | 3 | 10.0 | 0.05 | — | — | — | 1.5 | 0.5 | 0.75 | — | 559 | N₂100% | 50 | Ar 100% | 20 | 2.5 | |
| | 4 | 10.0 | 3.5 | — | — | — | 1.5 | 0.5 | 0.75 | — | 559 | Non-producible due to cracking of brazing filler metal during rolling | | | | | | |
| | 5 | 10.0 | 1.5 | — | 0.35 | — | 1.5 | 0.5 | 0.75 | — | 559 | Non-producible due to pressure bonding failure of brazing filler metal during clad rolling | | | | | | |
| | 6 | 10.0 | 1.5 | — | — | 0.35 | 1.5 | 0.5 | 0.75 | 0.5 | 559 | N₂100% | 50 | Ar 100% | 30 | 2.5 | 30 |
| | 7 | 10.0 | 1.5 | — | — | — | 3.0 | 0.5 | 0.5 | 0.5 | 559 | Unevaluable due to no production resulting from generation of giant intermetallic compound during casting | | | | | | |
| | 8 | 10.0 | 1.5 | — | — | — | 1.5 | 1.2 | 0.5 | 0.5 | 559 | Unevaluable due to no production resulting from cracking during casting | | | | | | |
| | 9 | 10.0 | 1.5 | — | — | — | 1.5 | 0.5 | 1.2 | 0.5 | 559 | Significant erosion occurred in base metal during brazing | | | | | | |
| | 10 | 10.0 | 1.5 | — | — | — | 1.5 | 0.5 | 0.5 | 1.2 | 559 | Significant erosion occurred in base metal during brazing | | | | | | |
| | 11 | 10.0 | 1.5 | — | — | — | 1.5 | 0.5 | 0.75 | 0.5 | 559 | N₂100% | 250 | Ar 100% | 20 | 2.5 | 80 |
| | 12 | 10.0 | 1.5 | — | — | — | 1.5 | 0.5 | 0.75 | 0.5 | 559 | " | 100 | " | 150 | 1.0 | 25 |
| | 13 | 10.0 | 1.5 | — | — | — | 1.5 | 0.5 | 0.75 | 0.5 | 559 | " | 50 | Ar50% + N₂75% | 25 | 75.0 | 80 |
| | 14 | 10.0 | 1.5 | — | — | — | 1.5 | 0.5 | 0.75 | 0.5 | 559 | " | 50 | " | 25 | 50.0 | 75 |
| | 15 | 10.0 | 1.5 | — | — | — | 1.5 | 0.5 | 0.75 | 0.5 | 559 | " | 50 | " | 25 | 30.0 | 80 |
| | 16 | 10.0 | 1.5 | — | — | — | 1.5 | 0.5 | 0.75 | 0.5 | 559 | " | 75 | " | 50 | 20.0 | 75 |
| | 17 | 10.0 | 1.5 | — | — | — | 1.5 | 0.5 | 0.75 | 0.5 | 559 | " | 75 | " | 50 | 5.0 | 80 |
| | 18 | 10.0 | 1.5 | — | — | — | 1.5 | 0.5 | 0.75 | 0.5 | 559 | Ar 100% | 75 | " | 50 | 15.0 | 80 |

REFERENCE SIGNS LIST

1. Brazing sheet
2. Corrugated fin

What is claimed is:

1. A brazing method of aluminum material, comprising: joining a brazing object including an aluminum alloy material provided with an Al—Si—Mg brazing filler metal by the Al—Si—Mg brazing filler metal without the use of flux by heating, when raising the temperature in a brazing furnace, the aluminum alloy material to a temperature of at least 450° C. before melting of the filler metal under a first inert gas atmosphere having an oxygen concentration of a first predetermined value and followed by heating at least at or above a temperature at which the filler metal starts to melt under a second inert gas atmosphere having an oxygen concentration of a second predetermined value lower than the first predetermined value and a nitrogen gas atmosphere of a predetermined concentration.

2. The brazing method of aluminum material according to claim 1, wherein the Al—Si—Mg brazing filler metal and the aluminum alloy material constitute a brazing sheet by cladding the brazing filler metal on the aluminum alloy material as a core material.

3. The brazing method of aluminum material according to claim 1, wherein the first predetermined value is 50 ppm, the second predetermined value is 25 ppm, and the predetermined concentration of the nitrogen gas concentration is 10% by volume.

4. The brazing method of aluminum material according to claim 1, wherein the second inert gas atmosphere has an inert atmosphere or a mixed inert atmosphere.

5. The brazing method of aluminum material according to claim 4, wherein the inert gas is argon.

6. The brazing method of aluminum material according to claim 1, wherein the first inert gas atmosphere is obtained by substituting the atmosphere of nitrogen gas, and the second inert gas atmosphere is obtained by substituting the first inert gas atmosphere by the gas or the mixed gas containing gas.

7. The brazing method of aluminum material according to claim 1, wherein the brazing filler metal contains Si: 5.0 to 13.0% and Mg: 0.1 to 3.0%, by mass, with the balance of Al and unavoidable impurities.

8. The brazing method of aluminum material according to claim 7, wherein the brazing filler metal further contains more than one of Be: 0.0001 to 0.1%, Bi: 0.01 to 0.3% and Ca: 0.002 to 0.3% by mass.

9. The brazing method of aluminum material according to claim 1, wherein the aluminum alloy material has a composition containing, by mass, more than one Mn: 0.2 to 2.5%, Cu: 0.05 to 1.0% and Si: 0.1 to 1.0% by mass, with the balance of Al and unavoidable impurities.

10. The brazing method of aluminum material according to claim 1, wherein the aluminum alloy material has a composition containing, by mass, Mg: 0.01 to 1.0%, and further containing more than one of Mn: 0.2 to 2.5%, Cu: 0.05 to 1.0% and Si: 0.1 to 1.0%, by mass, with the balance of Al and unavoidable impurities.

* * * * *